United States Patent Office 2,764,516
Patented Sept. 25, 1956

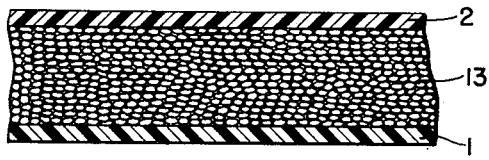
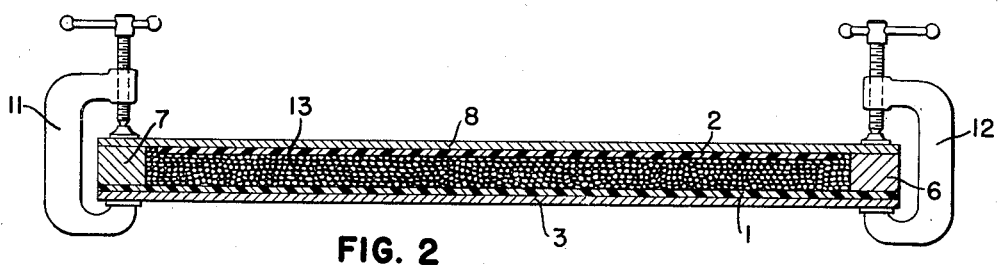
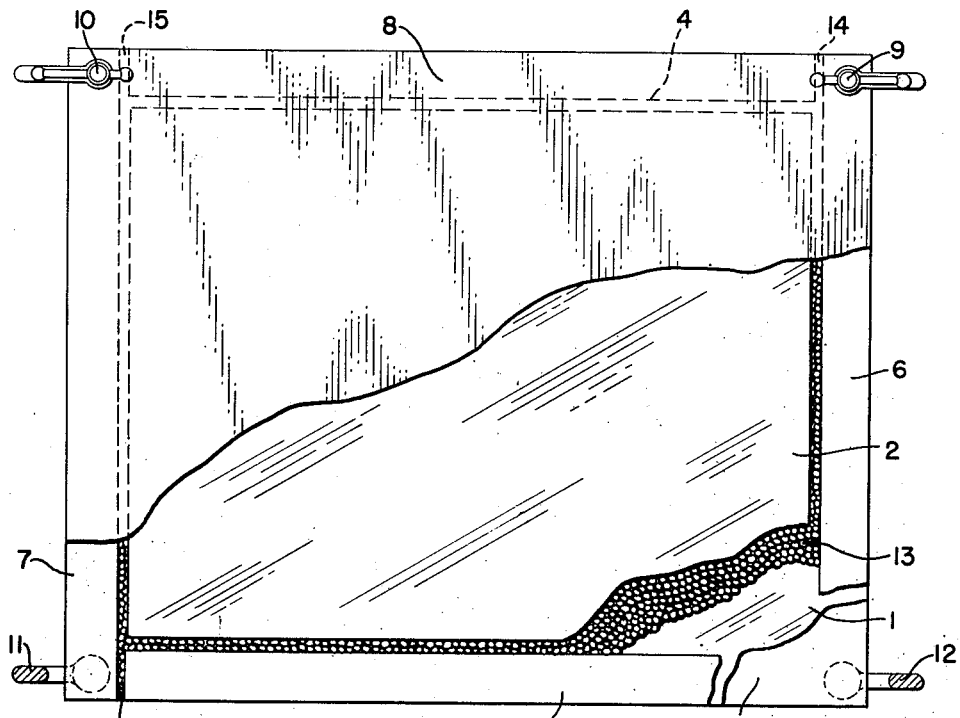

2,764,516

METHOD OF FORMING LAMINATED STRUCTURES

Henry A. Pace, Akron, Ohio, assignor to The Goodyear Tire & Rubber Company, Akron, Ohio, a corporation of Ohio Application February 23, 1955, Serial No. 489,845

5 Claims. (Cl. 154—110)

This invention relates to the production of expanded resin cellular articles and is particularly concerned with the construction of fabricated articles wherein a gas-evolving resin is foamed-in-place between two previously prepared skins or panels held in partial restraint and is a continuation-in-part of copending Serial No. 219,590, filed April 6, 1951, now abandoned.

It has been a problem in the field of expanded cellular resin fabrication to obtain a uniform foam without air pockets which is also light and tough and which has strong adhesion to the structure walls.

In the practice of this invention, fabricated articles are prepared by interiorly foaming a foamable material, said foaming being characterized by expansion under the partial restraint of a free-floating panel. The entire foaming action is rigidly limited by means of upper and lower platen members.

It is a primary object of this invention to provide a rigid, mechanically strong, lightweight structure comprising sheets of laminated material with a thermosetting resin interfoamed therebetween.

Another object of this invention is to provide a process for the manufacture of interfoamed panels which comprises foaming a gas-evolving composition between a stationary wall and a free-floating wall, expansion being limited by upper and lower platen members.

A further object of this invention is to provide a process for the manufacture of interfoamed structures whereby the structure is turned over after partial foaming in order to cause the bubbles to reverse their direction.

In practicing this invention the bubbles, which tend to rise to the top of the foaming mass, are caused to reverse their movement therethrough and approach the opposite side of the structure which is now at the top. In the meantime, however, the viscosity of the foam has increased and the bubbles encounter greater resistance as they rise. The effect is to compress the bubbles to smaller size and to retain them in the gelled foam. The result is a foamed core of optimum characteristics in which lightness of weight is secured with maximum strength and uniformity.

The above and other features of the present invention will be further understood when read in connection with the accompanying drawings wherein:

Fig. 1 is a vertical section of a completely foamed panel;

Fig. 2 is a vertical section of the foaming assembly showing the restraining means and the free-floating panel; and Fig. 3 is a cut-away top plan view showing the panel and restraining assembly.

In practicing this invention, structure walls 1 and 2 are prepared by roughing the bonding surfaces in order to obtain stronger adhesion to the foam. These walls can be of any material capable of adhesion with foamed cell structures. Such materials as cardboard, wood, sheet steel, and sheet aluminum can be used depending on the anticipated use for the product. Laminated fibrous glass is preferred in the practice of this invention, the fibrous glass cloth or mat customarily being impregnated with a polyester. Any of the commercial polyesters can be used for this purpose such as, for example, polyesters made from ethylene glycol, maleic anhydride and styrene. Because laminating resins and laminated skins are commercially available, they constitute no part of this invention.

The bottom wall is placed upon the rigid restraining platen member 3 and held in place by means of side shims 4 and 5 and end shims 6 and 7. The platen members are constructed of any rigid, non-breakable material, and in the practice of this invention are usually aluminum plates, reinforced to withstand the pressure generated by the expanding foam. The shims serve the function of limiting the elevational expansion of the foaming material and can be of any rigid material; in the practice of this invention, strips of wood have proved to be preferable.

A previously prepared foamable mixture is next spread evenly upon the wall 1. A doctor blade can be used to insure even distribution, the thickness depending upon the height of the expected blow. Generally, the free rise will ascend about four or five times the height of the doctor blade opening to produce a foam having a density of about 10 pounds per cubic foot. In practicing this invention, any foamable resinous material can be used, depending upon the use to which the final product is to be put. Chemical foaming, employing a blowing agent, may be used. A preferred procedure employs a diisocyanate as the active foaming ingredient to foam a glycerol adipate phthalate alkyd resin. Of course, other alkyd resins may be used.

The invention can be practiced with any of the various alkyd resins known in the art. These resins are generally the condensation products of polyhydric alcohols and polycarboxylic acids. Representative polyhydric alcohols which can be used in preparing alkyd resins for use in the practice of the invention are ethylene glycol, triethylene glycol, propylene glycol, dipropylene glycol, hexamethylene glycol, pinacol, and glycerol. Representative polycarboxylic acids which can be used in preparing alkyd resins by reaction with any of the above-mentioned polyhydric alcohols and others are phthalic, isophthalic, terephthalic, succinic, adipic, sebacic, maleic, fumaric, 2-phenylglutaric, citric, citraconic, mesaconic, itaconic, malonic, glutaric, pimelic, suberic, azelaic and sebacic acids. It is possible to substitute ester-forming derivatives, such as the anhydrides, the simple esters and the like for the acids themselves. Also certain mono-functional modifiers can be incorporated in the resin according to the known art. In order to have sufficient carboxyl radicals available to react with the isocyanates, it is desirable to keep the acid number of the alkyd resin within a range of 35 to 45.

In the practice of this invention, foaming is obtained by reacting an isocyanate or a mixture of isocyanates with the carboxyl groups of the alkyd resins and with any water which may be present in the resin. The isocyanate employed may be aliphatic or aromatic and in order to facilitate mixing should be liquid at normal temperatures. Representative isocyanates which can be used in preparing the foamable mixture are 2,4-tolylene diisocyanate, hexamethylene diisocyanate, diphenylmethane diisocyanate. Other polyisocyanates which can be used in the practice of this invention are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4, and cyclohexylene-1,2 diisocyanates; the aromatic compounds such as m-phenylene, p-phenylene, 4,4'-diphenyl, 1,5-naphthalene, and 1,4- naphthalene diisocyanates; the aliphatic-aromatic compounds such as 4,4'-diphenylene methane, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanto triphenyl methane, 1,3,5-triisocyanto benzene, and 2,4,6-triisocyanto toluene; and the tetraisocyanates such as 4,4'-dimethyl-diphenyl methane 2,2',5,5'-tetraisocyanate.

The top wall 2 is next rolled upon the foaming mixture in such a manner that it does not touch the side shims but floats free with no trapped air bubbles between it and the foaming material. The top platen member 8 is placed upon the shims with the expansion space therebetween and the entire assembly clamped rigidly together by means of C clamps 9, 10, 11 and 12.

When the mold has been assembled and foaming has started, the entire assembly is reversed in order to reverse the traversity of the larger bubbles to the surface, thus restraining them from reaching the interface of the foam and the sandwich wall by being trapped within the foam by virtue of its increasing viscosity. This reversing process makes possible the production of a superior foam with great uniformity of cell structure, coupled with low density and great strength. This reversing process also makes possible a stronger adhesion between the foam and the structure walls because no large surface bubbles are present. After the assembly is set up, foaming may be started and completed at room temperature or within a temperature range of 50° C. to 150° C. The temperature used in the foaming will depend upon the material used as the foaming medium.

The preferred alkyd resins of this invention, when modified with the preferred diisocyanate blowing agents, will start to foam at normal room temperatures immediately after mixing thus requiring mixing immediately prior to use. When the preferred combinations are used as the foamable material, inversion of the mold assembly can take place immediatelf after the floating panel has been put in place and the mold closed. The viscosity of the liquid foamable material is increasing so rapidly as to hold the composition intact until the floating panel engages the mold plate. When inversion thus takes place, the reversal of the trajection of the formed bubbles begins at once so that the large bubbles may be trapped and compressed by the increasing viscosity even before the mold is completely filled. Contrasted to this, combinations of alkyd resins and blowing agents can be used which require the application of considerable heat to initiate and complete the foaming in which instance the inversion of the mold assembly can take place at a much later time during the foaming operation, particularly when slow gelling resins are used. The inversion must take place after foaming has started and before foaming is completed by gelling of the resin in order to obtain the efficacy of the invention, to-wit, the trapping and compression of formed bubbles. Foaming can be controlled somewhat by various devices. For example, even fast foaming systems can be controlled by chilling or cooling. The foamable resin can actually be substantially completely inactivated if the temperature is reduced sufficiently. The entire foaming and gelling can be completed at temperatures as low as normal room temperatures up to about 150° C. After initiation of gas evolution, foaming can be completed at the same or a slightly elevated temperature. Depending upon the foaming medium used, the time required may vary considerably, from a few minutes (5 to 10) to as long as 2½ to 3 hours.

In practicing this invention, the quantity of foaming material required to completely fill the space provided with the foam 13 can be computed very accurately; however, a slight excess is desirable. The excess can push through orifices 14, 15, and 16 between the shims. As the orifices fill with foam and start to gel, lateral expansion is stopped and total restraint is placed upon the foaming material. As gas generation continues, an internal pressure ranging from 20 p. s. i. to 30 p. s. i. may be created. This internal pressure further compresses the bubbles and helps create a stronger foam. If desired, cores up to several inches in thickness can be prepared by using this process.

The invention can best be illustrated by means of the following examples which are intended as illustrative and not as limitations on the invention.

Example 1

A sandwich panel was prepared, using the following composition as the foamable mixture:

| | Grams |
|---|---|
| Glycerol-phthalate-adipate alkyd resin with an acid number of 43 | 930 |
| Kieselguhr | 140 |
| Meta tolylene diisocyanate | 856 |

The glycerol-phthalate-adipate alkyd resin and kieselguhr were stirred to homogeneity and then the tolylene diisocyanate was added at a temperature of about 30° C.

The jig in which the panel was prepared consisted of two reinforced ¼" x 22" x 40" aluminum plates and two accurately cut hard wooden shims .640" x 1" x 40" for the sides and two .640" x 1" x 19.5" shims for the ends.

A .01" x 22" x 40" sanded fibrous glass laminate was placed upon the bottom aluminum plate and the shims put in place. A spreading or doctor blade was adjusted so that a uniform mixture of the foaming material was spread to a thickness of .147".

A second sanded fibrous glass laminate panel was gently rolled onto the surface of the foaming mixture so that it floated free of the shims with about ³⁄₁₆-inch clearance. Care was exercised to avoid inclusion of any foaming mixture between the shims and platens for this material would foam and thus create an uneven structure.

The second aluminum plate was next carefully placed in position on top and the entire assembly was clamped together with C clamps.

Partial foaming was completed after which the assembly was turned over and foaming and gelling completed. The plates and shims were then removed and the panel trimmed to size with a band saw.

Tests indicated that this panel had a density of 9.95 pounds per cubic foot and that the thickness gauge was very uniform. A cross section showed that the gas bubbles were very uniform and quite small in comparison with foams prepared in other ways.

Example 2

A sandwich panel was prepared, using the following composition as the foamable mixture:

| | Grams |
|---|---|
| Glycerol-phthalate-adipate alkyd resin with an acid number of 45 | 930 |
| Meta tolylene diisocyanate | 856 |

The sandwich panel was prepared by using the same procedure as described in Example 1.

Tests indicated that this panel had a density of about 10 pounds per cubic foot and that the thickness gauge was very uniform. A cross section showed a very fine foam structure with no large voids.

Example 3

The following ingredients were used in preparing a sandwich panel:

| | | |
|---|---|---|
| Alkyd 100 | grams | 440.0 |
| Diatomaceous earth | do | 66.0 |
| 2,4-tolylene diisocyanate | cc | 240.0 |

Alkyd 100 is a polyester having an acid number of 35 to 45 prepared by interacting glycerol with adipic acid and phthalic anhydride.

The above composition was stirred at room temperature for about 7 minutes after which it was stirred for an additional 10 minutes in an ice bath so that the pouring temperature remained at about 30° C. This foamable mixture was poured into the mold cavity, prepared according to the procedure described in Example 1. The depth of the foamable mixture was established and the surface smoothed by means of a doctor blade. Thereafter, a floating laminate was placed over the surface and rolled with a mahogany rolling pin. After placing the top mold cover thereon, the jig was placed upside down in a 70° C. oven and left over night. The mold assembly was thereafter dismantled and a section of foam inspected for porosity and checked for density. The porosity was extremely uniform throughout the section, the density was determined to be 11.7 pounds per cubic foot.

*Example 4*

A sandwich panel was prepared as in Example 3, using the following ingredients:

| | | |
|---|---|---|
| Alkyd 100 | grams | 500 |
| Diatomaceous earth | do | 75 |
| 2,4-tolylene diisocyanate | cc | 275 |

The alkyd 100 is a polyester having an acid number of 35 to 45 prepared by interacting glycerol with adipic acid and phthalic anhydride.

This sample gave very uniform cell structure and had a density of 12.2 pounds per cubic foot.

Various other panels were prepared varying the skin composition and core thicknesses. Skin thickness was varied from .01" to .04", core thickness from .18" to .63" and overall thicknesses from .35" to .65". Cores up to several inches in thickness have been prepared in this manner.

Although this invention is illustrated by the preparation of sandwich panels, various other structures amenable to the spreading of a uniform material with a doctor blade can be prepared in practicing the invention. Thus, it is possible to practice this invention on an assembly line basis by using a continuous cure and hydraulic restraining means.

Uses for the products of this invention are many and varied. The fine insulating qualities are useful in building insulation, sound-proofing and the insulation of appliances, such as refrigerators.

While certain representative embodiments and details have been shown for the purpose of illustrating the invention, it will be apparent to those skilled in this art that various changes and modifications may be made therein without departing from the spirit or scope of the invention.

I claim:

1. A process for the manufacture of laminated interfoamed structures having a foamed interior bonded to confining laminae comprising placing a structure wall upon a rigid mold platen member, placing confining shims about the periphery of said platen member and overlying the peripheral surface of said structure wall, placing a layer of a foamable composition comprising an alkyd resin and an organic polyisocyanate evenly on said structure wall, placing a floating structure wall upon the surface of said foamable composition adjacent to but slightly removed from said confining shims, placing another rigid mold platen member on the confining shims so that an expansion space remains between the floating structure wall and the upper platen member, retaining the platen members in rigid spaced-apart relation by clamping means, inverting the mold assembly after foaming has started but before foaming has been completed and completing the foaming of said foamable composition while said mold assembly is in the inverted position by heating said assembly until the foamed composition is completely set and the structure walls are joined thereto.

2. A process for the manufacture of laminated interfoamed structures having a foamed interior bonded to confining laminae comprising placing a structure wall upon a rigid mold platen member, placing confining shims about the periphery of said platen member and overlying the peripheral surface of said structure wall, the confining shims being placed so as to provide vents for the escape of entrapped air, placing a layer of a foamable composition comprising an alkyd resin and an organic polyisocyanate evenly on said structure wall, placing a floating structure wall upon the surface of said foamable alkyd resin composition adjacent to but slightly removed from said confining shims, placing another rigid mold platen member on the confining shims so that an expansion space remains between the floating structure wall and the upper platen member, retaining the platen members in rigid spaced-apart relation by clamping means, initiating foaming of said foamable composition, inverting the mold assembly after foaming has started but before foaming and gelling has been completed in order to reverse the bubble traversion of the expanding foam and completing the foaming and gelling of the alkyd resin foam of said interfoamed structure while in the inverted position by heating until the foam is completely set and the structure walls are joined thereto.

3. A process for the manufacture of laminated interfoamed structures having a foamed interior bonded to confining laminae comprising placing a structure wall upon a rigid mold platen member, placing confining shims about the periphery of said platen member and overlying the peripheral surface of said structure wall, placing a layer of a foamable composition comprising an alkyd resin and an organic polyisocyanate evenly on said structure wall, placing a floating structure wall upon the surface of said foamable composition adjacent to but slightly removed from said confining shims, placing another rigid mold platen member on the confining shims so that an expansion space remains between the floating structure wall and the upper platen member, retaining the platen members in rigid spaced-apart relation by clamping means, inverting the mold assembly immediately after foaming has started, and completing the foaming of said foamable composition while said mold assembly is in the inverted position by heating said assembly until the foamed composition is completely set and the structure walls are joined thereto.

4. The process according to claim 1 wherein the alkyd resin is a glycerol-phthalate-adipate resin and the polyisocyanate is metatolylene diisocyanate.

5. The process according to claim 4 wherein the structure walls are laminated fibrous glass.

References Cited in the file of this patent

UNITED STATES PATENTS

| | | |
|---|---|---|
| 1,515,475 | Goodwin | Nov. 11, 1924 |
| 2,106,840 | Gould | Feb. 1, 1938 |
| 2,568,672 | Warrick | Sept. 18, 1951 |
| 2,576,073 | Kropa | Nov. 20, 1951 |
| 2,639,252 | Simon et al. | May 19, 1953 |